United States Patent Office 2,985,523
Patented May 23, 1961

2,985,523

CRACKED GASOLINE CONTAINING CONDENSATION POLYMERS AS ANTIOXIDANTS

Walter M. Chamot, Brookfield, Ill., assignor to Nalco Chemical Company, a corporation of Delaware No Drawing. Original application Jan. 9, 1958, Ser. No. 707,856. Divided and this application Dec. 22, 1958, Ser. No. 781,853

8 Claims. (Cl. 44—73)

This invention relates to cracked petroleum distillate fuels containing oil soluble condensation polymers of aniline and substituted anilines, alkylene polyamines and lower aliphatic aldehydes and, more particularly, to the use of these condensation polymers as antioxidants in cracked petroleum distillate fuels, particularly in cracked gasoline. This application is a divisional application of my copending application Serial No. 707,856, filed January 9, 1958.

Due to the various refining techniques used in the production of liquid petroleum fuels such as gasoline, it is well known that such products tend to deteriorate and that this deterioration is prevented by incorporating with such fuels minor amounts of materials known as stabilizers or antioxidants. The catalytic cracking of petroleum hydrocarbons to form gasolines tend to produce products which are unstable and which form sludges or gums. They also tend to discolor the gasolines under conditions of storage and use. It is extremely beneficial to have chemicals to retard these effects, but these additives must be added in very small amounts so as not to interfere with the performance of gasolines in internal combustion engines.

The present invention has for one of its objects the incorporation into cracked petroleum fuels of minor amounts of novel polymeric substances which will prevent the decomposition and oxidation of these materials.

Another object is to provide new compositions of gasoline containing antioxidants which give superior results at extremely small dosages. Other objects will appear hereinafter.

The condensation polymers contemplated within the scope of this invention are formed by condensing aniline or a substituted aniline with alkylene polyamines and a lower aliphatic aldehyde at a molar ratio of aniline or substituted aniline to alkylene polyamine in the range of 1:0.5–1, respectively, and a molar amount of the aldehyde within the range of 1.5–2.1 times the total mols of the aniline with the further proviso that the total mols of aldehyde do not exceed 1.1 times the total mols of the aniline and the alkylene polyamine. Molar ratios of anilines to aldehydes to polyamines of approximately 1:2:1, respectively, are eminently suitable as stabilizers for gasolines. The products vary from viscous liquids to solid compositions, all of which are oil soluble. The polymers so produced are essentially linear in nature and are essentially free of cross-linking. It has been found that the antioxidant activity of the substantially linear polymers of the instant invention is good with polymers having either low or high degrees of condensation. In general, the polymers contemplated by this invention are estimated to have a molecular weight in the range of about 500–10,000.

The anilines and substituted anilines which may be used to prepare the polymers may be such materials as aniline, alkyl substituted anilines, N-substituted anilines, and alkyl substituted and N-substituted anilines. Because the polymers are believed to be substantially linear in molecular configuration, it is desirable that the particular aniline employed contain at least two reactive positions, generally the ortho- and para-positions, with which the aldehyde may react. Typical examples of anilines that may be employed in the preparation of the polymers include such chemicals as aniline, N-methyl aniline, N,N-dimethyl aniline, para-octyl aniline, para-octadecyl aniline, para-methyl-N,N-dihexyl aniline, and meta ethyl N,N-dimethyl aniline. Anilines useful in accordance with the present invention include those falling within the following structural formula:

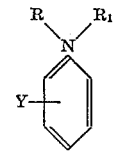

wherein R and $R_1$ are hydrogen or a lower alkyl group of not more than six carbons, and R and $R_1$ may be the same or different; and Y is hydrogen or an aliphatic hydrocarbon radical containing up to 18 carbons.

The alkylene polyamines that may be used include such materials as ethylene diamine, hexamethylene diamine, diethylene triamine, triethylene tetramine, tetraethylene pentamine, trimethylene diamine, propylene diamine, dipropylene triamine, and the like. The amines employed should contain a minimum of at least two amino groups having a reactive hydrogen on the amino nitrogens, i.e., primary or secondary amino groups. In addition to using the alkylene polyamines the substituted alkylene polyamines such as hydroxyethyl ethylene diamine and similar compounds may be used with equal facility. The preferred alkylene diamines are the polyalkylene polyamines—diethylene triamine giving a polymer which is outstanding as an antioxidant for cracked petroleum fuels.

The aldehydes are preferably lower aliphatic aldehydes having 1–2 carbons (formaldehyde and acetaldehyde). Formaldehyde may be used in its gaseous form or in other forms such as the solid paraformaldehyde or formaldehyde dissolved in water and nonaqueous polar media such as isopropanol.

The polymers are usually prepared by first mixing the aniline and alkylene polyamine and then adding the aldehyde with cooling. An initial reaction occurs on the addition of the aldehyde, and cooling is necessary. The reaction mixture is then heated to at least 80° C. for a period of ½ hour or more at atmospheric pressure or under vacuum. The water of reaction resulting from the condensation is removed in order to obtain a high degree of polymerization. This may be done by including in the reaction mixture a solvent for the water such as isopropanol—the solvent having a boiling point above the reaction temperature. Preferably, however, the water is removed by distillation from the reaction mixture. The reaction may be conducted at elevated temperatures ranging from about 80° C. to as high as 250° C. for periods of time ranging from as little as ½ hour to over 20 hours. As a general rule, the more elevated the temperature the shorter will be the reaction time. Also, the higher the temperature and the longer the reaction time, the more viscous the products become.

In order to illustrate the preparation of the several typical polymers the following are given by way of example:

EXAMPLE I

Formaldehyde was dissolved in isopropanol and was added to a mixture of N,N-dimethyl aniline and diethylene triamine with cooling. The molar ratio of the aniline to formaldehyde to the polyamine was 1:2:1, respectively. After the initial heat had dissipated, the reaction mixture was heated at 85° C. at atmospheric pressure for 14 hours. The resultant product was a viscous, red polymer which was soluble in isopropanol.

EXAMPLE II

The same general procedure and molar ratio of reactants was employed as in Example I, but instead of using diethylene triamine, tetraethylene pentamine was used. The mixture was refluxed at 85–95° C. for 2 hours, and the solvent was removed under vacuum. The resultant product was a light yellow, viscous liquid.

EXAMPLE III

Aniline was mixed with paraformaldehyde and cooled to 15° C. Ethylene diamine was added slowly with cooling. An exothermic reaction resulted which gradually allowed the paraformaldehyde to dissolve into the liquid mixture of the amine and aniline. The mixture, containing the aniline, formaldehyde, and polyamine at mol ratios of 1:2:1, respectively, was gradually heated up to 115° C. for 15 minutes under about 100 mm. vacuum. A sample of this product was withdrawn which was a light yellow, viscous liquid having a viscosity in centipoises of 50–75. The heat was then elevated to 175° C. with the vacuum still applied, a more viscous liquid of about 150–200 centipoise viscosity resulted. Further heating at 210–220° C. under vacuum for 30 minutes resulted in a very viscous red liquid which was nearly a solid.

The products produced in each of the above examples are readily soluble in such solvents as benzene, isopropanol, and methyl alcohol and are soluble in gasoline and similar related liquid hydrocarbons in the concentrations employed in antioxidant or stabilization treatment thereof.

To demonstrate the usefulness of these polymers as antioxidants for cracked petroleum distillates the oxidation stability of a cracked gasoline was determined by the induction period method described in ASTM designation D525–49. Briefly, the aforementioned ASTM induction test involves the initial establishment of a 100 lbs. oxygen atmosphere in a closed bomb over a body of gasoline to be tested. The temperature is maintained at 100° C., and the test is terminated when the pressure drop in the test vessel is more than two lbs. in a 15-minute period. The total time of the test period is observed—the longer the induction period, the better is the stability of the gasoline being tested.

The amounts of both additives tested were 100 parts per million on a weight basis. A commercial antioxidant, 2-6-ditertiarybutyl-4-methylphenol, was used for purposes of comparison.

*Table I*

| Test No. | Treatment | Induction Period, hours |
|---|---|---|
| 1 | Blank | 11½ |
| 2 | 2,6-ditertiarybutyl-4-methylphenol | 14½ |
| 3 | Composition of Example I | 33 |

From the above it becomes obvious that the compositions of the invention are superior to the commercial antioxidant and are effective at extremely low dosages. When treating cracked petroleum distillate fuels good results are obtained when the products are used at a dosage of as little as 0.5 part per million on a weight basis with good results being obtained at 10 to 50 parts per million. In some cases it may be necessary to use up to 500 parts per million, but generally this is an extreme case.

It has been observed that the compositions of this invention also have metal deactivating properties. Metals such as iron and copper act as catalysts in the degradation of gasolines, and minute amounts of the metals accelerate the degradation rate manyfold. The compositions of this invention retard the undesirable catalytic effect of metals—a property usually referred to as metal deactivating.

The invention is hereby claimed as follows:

1. A cracked gasoline containing 0.5 to 500 parts per million by weight of substantially linear condensation polymers formed by the condensation reaction of N,N-dimethyl aniline, formaldehyde, and a polyalkylene polyamine in a mol ratio of N,N-dimethyl aniline to polyalkylene polyamine in the range of 1:0.5–1, respectively, and the molar amount of said formaldehyde equal to 1.5–2.1 times the total mols of said N,N-dimethyl aniline with the further proviso that the total mols of aldehyde do not exceed 1.1 times the total mols of the aniline and the alkylene polyamine.

2. A cracked gasoline containing 0.5 to 500 parts per million by weight of substantially linear condensation polymers formed by the condensation reaction of N,N-dimethyl aniline, formaldehyde, and diethylene triamine in a mol ratio of N,N-dimethyl aniline to diethylene triamine in the range of 1:0.5–1, respectively, and the molar amount of said formaldehyde equal to 1.5–2.1 times the total mols of said N,N-dimethyl aniline with the further proviso that the total mols of aldehyde do not exceed 1.1 times the total mols of the aniline and the diethylene triamine.

3. A cracked gasoline containing 0.5 to 500 parts per million by weight of substantially linear condensation polymers formed by the condensation reaction of N,N-dimethyl aniline, formaldehyde, and triethylene tetramine in a mol ratio of N,N-dimethyl aniline to triethylene tetramine in the range of 1:0.5–1, respectively, and the molar amount of said formaldehyde equal to 1.5–2.1 times the total mols of said N,N-dimethyl aniline with the further proviso that the total mols of aldehyde do not exceed 1.1 times the total mols of the aniline and the triethylene tetramine.

4. A cracked gasoline containing 0.5 to 500 parts per million by weight of substantially linear condensation polymers formed by the condensation reaction of aniline, formaldehyde, and a polyalkylene polyamine in a mol ratio of aniline to polyalkylene polyamine in the range of 1:0.5–1, respectively, and the molar amount of said formaldehyde equal to 1.5–2.1 times the total mols of said aniline with the further proviso that the total mols of aldehyde do not exceed 1.1 times the total mols of the aniline and the alkylene polyamine.

5. A cracked gasoline containing 0.5 to 500 parts per million by weight of substantially linear condensation polymers formed by the condensation reaction of aniline, formaldehyde, and ethylene diamine in a mol ratio of aniline to ethylene diamine in the range of 1:0.5–1, respectively, and the molar amount of said formaldehyde equal to 1.5–2.1 times the total mols of said aniline with the further proviso that the total mols of aldehyde do not exceed 1.1 times the total mols of the aniline and the ethylene diamine.

6. A cracked gasoline containing antioxidant amounts of substantially linear condensation polymers formed by the condensation reaction of (1) an aniline having the following formula:

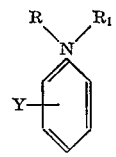

wherein R and $R_1$ are selected from the group consisting of hydrogen and a lower alkyl radical of from 1 to 6 carbon atoms, and wherein Y is selected from the group consisting of hydrogen and an aliphatic hydrocarbon radical containing from 1 to 18 carbon atoms, (2) alkylene polyamines having reactive hydrogens on at least two amino nitrogens, and (3) lower aliphatic aldehydes selected from the group consisting of formaldehyde and acetaldehyde, the mol ratio of said aniline to said alkylene polyamines being in the range of 1:0.5–1, respectively, and the mols of said aldehyde being 1.5–2.1 times the total mols of said aniline with the further proviso that the total mols of aldehyde do not exceed 1.1 times the total mols of the aniline and the alkylene polyamine.

7. A cracked gasoline containing 0.5 to 500 parts per million by weight of substantially linear condensation polymers formed by the condensation reaction of (1) an aniline having the following formula:

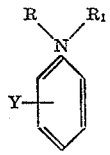

wherein R and $R_1$ are selected from the group consisting of hydrogen and a lower alkyl radical of from 1 to 6 carbon atoms, and wherein Y is selected from the group consisting of hydrogen and an aliphatic hydrocarbon radical containing from 1 to 18 carbon atoms, (2) alkylene polyamines having reactive hydrogens on at least two amino nitrogens, and (3) lower aliphatic aldehydes selected from the group consisting of formaldehyde and acetaldehyde, the mol ratio of said aniline to said alkylene polyamines being in the range of 1:0.5–1, respectively, and the mols of said aldehyde being 1.5–2.1 times the total mols of said aniline with the further proviso that the total mols of aldehyde do not exceed 1.1 times the total mols of the aniline and the alkylene polyamine.

8. A cracked gasoline containing antioxidant amounts of substantially linear condensation polymers formed by the condensation reaction of (1) an aniline having the following formula:

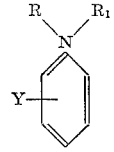

wherein R and $R_1$ are selected from the group consisting of hydrogen and a lower alkyl radical of from 1 to 6 carbon atoms, and wherein Y is selected from the group consisting of hydrogen and an aliphatic hydrocarbon radical containing from 1 to 18 carbon atoms, said aniline being unsubstituted in at least two of the three ortho and para positions in the aryl ring, (2) alkylene polyamines having reactive hydrogens on at least two amino nitrogens, and (3) lower aliphatic aldehydes having 1-2 carbons, the mol ratio of said aniline to said alkylene polyamines being in the range of 1:0.5–1, respectively, and the mols of said aldehyde being 1.5–2.1 times the total mols of said aniline with the further proviso that the total mols of aldehyde do not exceed 1.1 times the total mols of the aniline and the alkylene polyamine.

References Cited in the file of this patent

UNITED STATES PATENTS

| | | |
|---|---|---|
| 1,594,983 | Somerville | Aug. 3, 1926 |
| 2,265,051 | Adams | Dec. 2, 1941 |